(12) United States Patent
Peng

(10) Patent No.: US 11,253,342 B2
(45) Date of Patent: Feb. 22, 2022

(54) INTEGRAL FALSE TOOTH IMPLANTING DEVICE HAVING EXPANSION/WIDENING EFFECT AT BOTH UPPER AND LOWER PORTIONS

(71) Applicant: Zhijun Peng, Guangdong (CN)

(72) Inventor: Zhijun Peng, Guangdong (CN)

( * ) Notice: Subject to any disclaimer, the term of this patent is extended or adjusted under 35 U.S.C. 154(b) by 51 days.

(21) Appl. No.: 16/898,449

(22) Filed: Jun. 11, 2020

(65) Prior Publication Data

US 2021/0000571 A1 Jan. 7, 2021

(30) Foreign Application Priority Data

Jul. 4, 2019 (CN) .......................... 201910601105.5

(51) Int. Cl.
*A61C 8/00* (2006.01)

(52) U.S. Cl.
CPC .................................. *A61C 8/0033* (2013.01)

(58) Field of Classification Search
CPC .................................................... A61C 8/0033
USPC .......................................................... 433/174
See application file for complete search history.

(56) References Cited

U.S. PATENT DOCUMENTS

| | | | | |
|---|---|---|---|---|
| 5,766,009 A * | 6/1998 | Jeffcoat | ................ | A61C 8/0033 433/173 |
| 6,227,860 B1 * | 5/2001 | Hobo | ................... | A61C 8/0033 433/173 |
| 6,840,770 B2 * | 1/2005 | McDevitt | ............. | A61C 8/0033 433/173 |
| 8,486,120 B2 * | 7/2013 | Shimko | ................ | A61C 8/0033 606/303 |
| 9,526,592 B2 * | 12/2016 | Shribman | ............ | A61C 8/0033 |
| 9,585,735 B2 * | 3/2017 | Greenberg | ........... | A61C 8/0074 |
| 9,788,920 B2 * | 10/2017 | Lacaze | ................. | A61B 17/686 |
| 2002/0028423 A1 * | 3/2002 | Levisman | ............ | A61C 8/0033 433/173 |
| 2003/0186194 A1 * | 10/2003 | Corti | .................... | A61B 17/666 433/153 |
| 2003/0224328 A1 * | 12/2003 | Sapian | ................. | A61C 8/0077 433/173 |
| 2006/0194171 A1 * | 8/2006 | Lazarof | ................ | A61C 8/0033 433/173 |
| 2014/0148864 A1 * | 5/2014 | Lacaze | ................. | A61B 17/844 606/327 |
| 2021/0000571 A1 * | 1/2021 | Peng | .................... | A61C 8/0048 |

* cited by examiner

*Primary Examiner* — Matthew M Nelson

(57) ABSTRACT

A false tooth implanting device, having an expandable implant body, a lower protruding block at a recess of a lower portion of the implant body, a vertical screw, and a lateral screw; the recess has a first slanted engaging surface; an upper portion of the expandable implant body is provided with a vertical hole and a first portion of a vertical screw hole; the lower protruding block is provided with a second slanted engaging surface in contact with the first slanted engaging surface and a second portion of the vertical screw hole; the vertical screw passes through the vertical screw hole; the upper portion of the expandable implant body is provided with an expansion crevice and a lateral screw hole; when the lateral screw is screwed into the lateral screw hole, the upper portion of the expandable implant body is widened by expanding away from the expansion crevice.

4 Claims, 4 Drawing Sheets

INTEGRAL FALSE TOOTH IMPLANTING DEVICE HAVING EXPANSION/WIDENING EFFECT AT BOTH UPPER AND LOWER PORTIONS

BACKGROUND OF THE INVENTION

Nowadays, when it is required to implant a false tooth, it is usually required to cut open the gum at the missing tooth position, and then drill a hole for implant in the bone beneath the gum, and then screw a false tooth implant having outer screw threads into the hole. After the wound at the gum recovers, a false tooth will be mounted on the implant, and thus achieving the purpose of implanting a false tooth. This way of implanting a false tooth has the following problems: after a certain period of time, fractures may easily develop at the joint portion between the screw threads of the implant and the bone, and as a result, the false tooth will be loosened which affects biting and chewing performance, and problems like swelling and inflammation of the gum may also easily be induced.

When the above problems of loosed false tooth and swelling or inflammation of the gum happen, patients can only seek for dental treatments and re-implanting the false tooth. Basically, what the dentist do includes cutting open the gum, taking out the original implant, carrying out a series of anti-inflammatory procedures, removing the damaged screw in the original hole for implant, repairing the hole or expanding the hole or drilling a new hole, and then screwing in a new implant, waiting until the wound on the gum recovers, and then mounting a new false tooth on the new implant.

Due to the structural design of the prior art false tooth implant, dentist can only operate to serve his every patients as described above. Since the implant is fixed by engaging a screw to the bone, bone fragments may be easily left in the hole while screwing in the implant into the hole. Bone fragments left in the hole are detached from the lively bone where they are from, so the bone fragments are dead tissues and may easily decay and thus induce swelling and inflammation. Further, the patient will be inflicted with wounds every time a loosened false tooth has to be repaired, therefore the patient will be more stressful and feels unrest, also the patient's normal life will be significantly affected. Moreover, the cost for re-implanting a false tooth is very expensive, therefore the patient has to spend more money for this purpose.

In view of the above, prior art false tooth implantation has at least the following problems: injury of the bone caused by screw threads, loose implantation of the false tooth resulting in loosening of the false tooth, existence of bone fragments that may induce swelling and inflammation, repeated infliction of wounds that cause much suffering of the patient, and a high cost for maintenance. Therefore, modification and development of prior art false tooth implantation is desperately required.

BRIEF SUMMARY OF THE INVENTION

In view of the aforesaid disadvantages now present in the prior art, the present invention provides an integral false tooth implanting device having expansion/widening effect at both upper and lower portions. The present invention has an integral design of an expandable implant body to facilitate simpler and more convenient operation by a dentist, thereby improving the quality of false tooth implantation and thus reducing the need for re-implantation. Also, since an upper portion of the expandable implant body is expandable while a lower portion of the expandable implant body can be widened by the protruded lower protruding block to achieve fixation, wherein fixing power of screws is transformed to lateral expansion/widening force to achieve fixation, screw threads of the screws will not be directly impacted by external forces and the screws will not be loosened, because the external forces caused by biting and chewing using the false tooth will be borne by the expandable implant body. Further, a larger frictional contact fixing surface is obtained between the false tooth implanting device and the implant hole, so that the implant and the mounting thereof are firm and safe will not easily get loose. Besides, since the false tooth implanting device abuts against the implant hole when being placed in the implant hole, the entire false tooth implanting device will not rotate and therefore will not injure the inner wall of the implant hole in the bone, also no bone fragments will be resulted that may induce swelling and inflammation. Therefore, the present invention can effectively reduce the pain suffered by the patient of false tooth implantation, and prevent the patient from suffering from pain and traumatic injuries twice or even more times. Moreover, the present invention has a very low cost to use and has a simple structure, and it is easy to be implemented.

The present invention has the following technical solutions: An integral false tooth implanting device having expansion/widening effect at both upper and lower portions, comprising an integral expandable implant body, a lower protruding block, a vertical screw, and a lateral screw; wherein a lower portion of the expandable implant body is provided with a recess that accommodates the lower protruding block; the recess has a first slanted engaging surface; an upper portion of the expandable implant body is provided with a vertical hole extending from a top side of the expandable implant body down to a middle portion of the expandable implant body; the expandable implant body is also provided with a first portion of a vertical screw hole in communication with and extending down from a bottom side of the vertical hole till the recess; correspondingly, an inner side of the lower protruding block facing to the recess is correspondingly provided with a second slanted engaging surface; a second portion of the vertical screw hole continues from a bottom end of the first portion of the vertical screw hole and opens down to the lower protruding block from the second slanted engaging surface; the second slanted engaging surface and the first slanted engaging surface are in contact with each other, and the vertical screw passes through the first portion of the vertical screw hole of the expandable implant body down to the second portion of the vertical screw hole of the lower protruding block, and as the vertical screw rotates so as to be tightened, the lower protruding block moves upwardly wherein the second slanted engaging surface of the lower protruding block slides upwardly along the first slanted engaging surface, therefore an outer side surface of the lower protruding block protrudes out of an outer periphery of the expandable implant body; an expansion crevice is provided across the entire upper portion of the expandable implant body; a lateral screw hole is provided laterally across the entire expansion crevice from a lateral side of the expansion crevice, and a diameter of the lateral screw hole is smaller than a cross sectional diameter of the lateral screw, so that when the lateral screw is screwed into the lateral screw hole, the expansion crevice is widened apart, and so the upper portion of the expandable implant body is widened by expanding away from the expansion crevice.

Further, in order that the lower protruding block will not be biased to one side or displaced during its upward movement, a guiding structure is provided between the second slanted engaging surface and the first slanted engaging surface; said guiding structure comprises a slanted guiding groove and a slanted guiding block.

Further, to increase frictional force during implanting procedure of the present invention in order to obtain better fixing effect without any slipping, anti-slippery textured patterns are provided around outer peripheral surfaces of the expandable implant body and the lower protruding block.

After implantation of the false tooth is completed, in order to prevent bone calcification at the jaw bone where the false tooth implanting device is positioned, a plurality of blood flow pores are provided on the expandable implant body and the lower protruding block; the blood flow pores can effectively prevent blockage of blood flow and thus preventing bone calcification.

The present invention has the following beneficial effects: The present invention has an integral design of an expandable implant body to facilitate simpler and more convenient operation by a dentist, thereby improving the quality of false tooth implantation and thus reducing the need for re-implantation. Also, since an upper portion of the expandable implant body is expandable while a lower portion of the expandable implant body can be widened by the protruded lower protruding block to achieve fixation, wherein fixing power of screws is transformed to lateral expansion/widening force to achieve fixation, screw threads of the screws will not be directly impacted by external forces and the screws will not be loosened, because the external forces caused by biting and chewing using the false tooth will be borne by the expandable implant body. Further, a larger frictional contact fixing surface is obtained between the false tooth implanting device and the implant hole, so that the implant and the mounting thereof are firm and safe will not easily get loose. Besides, since the false tooth implanting device abuts against the implant hole when being placed in the implant hole, the entire false tooth implanting device will not rotate and therefore will not injure the inner wall of the implant hole in the bone, also no bone fragments will be resulted that may induce swelling and inflammation. Therefore, the present invention can effectively reduce the pain suffered by the patient of false tooth implantation, and prevent the patient from suffering from pain and traumatic injuries twice or even more times. Moreover, the present invention has a very low cost to use and has a simple structure, and it is easy to be implemented. During implementation of the present invention, even if the false tooth is damaged, only the crown is required to be replaced without affecting the implant in the bone. Every time the crown is replaced, an excellent therapeutic effect can be restored. Therefore, the patient can experience an economical, effective and comfortable experience of replacing a false tooth.

DETAILED DESCRIPTION OF THE INVENTION

Figure 1:
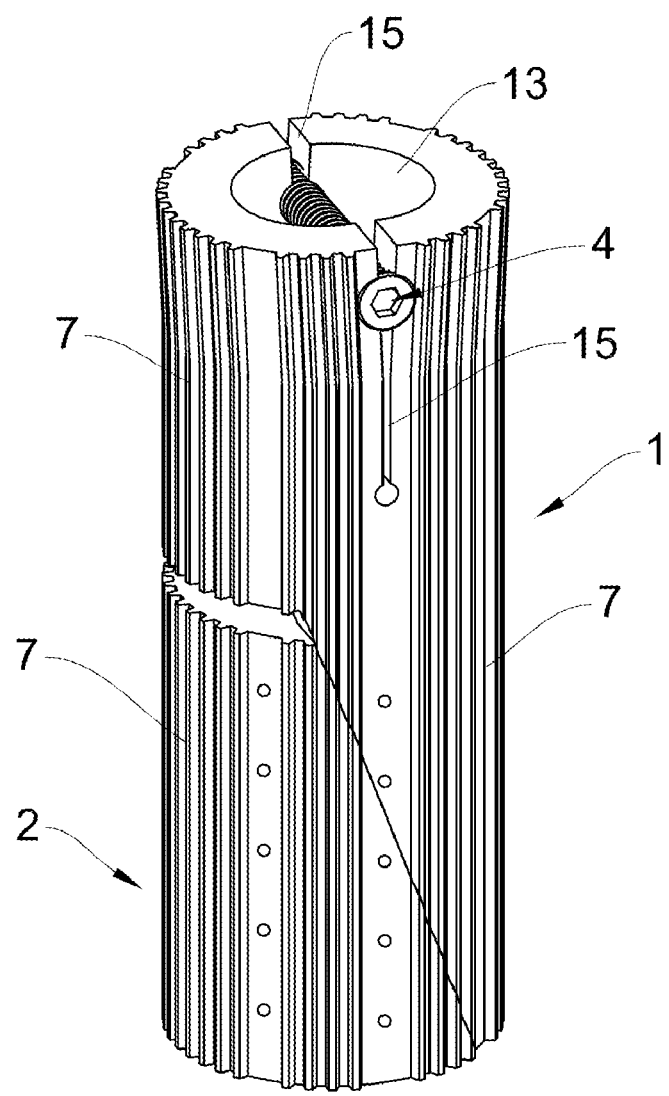
FIG. 1 is a perspective structural view of the present invention.
Figure 2:
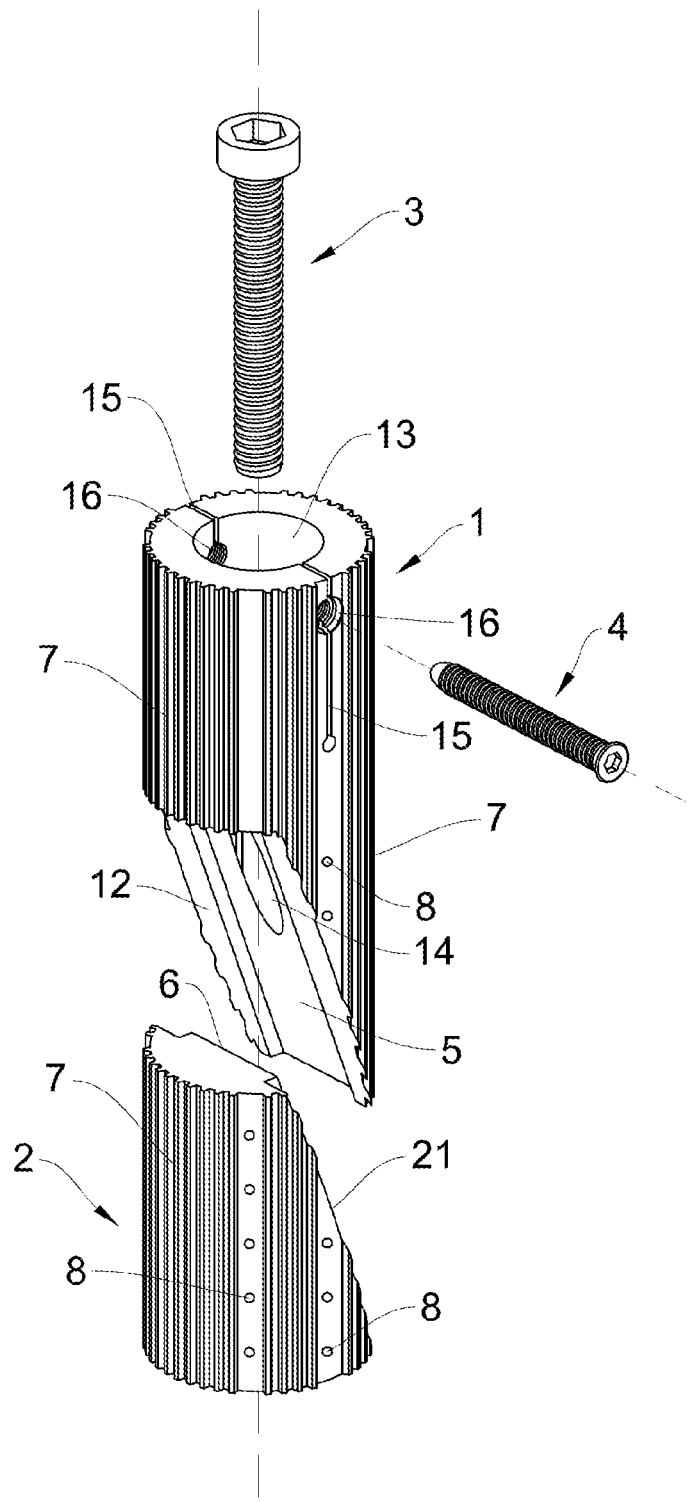
FIG. 2 is an exploded structural view of the present invention.
Figure 3:
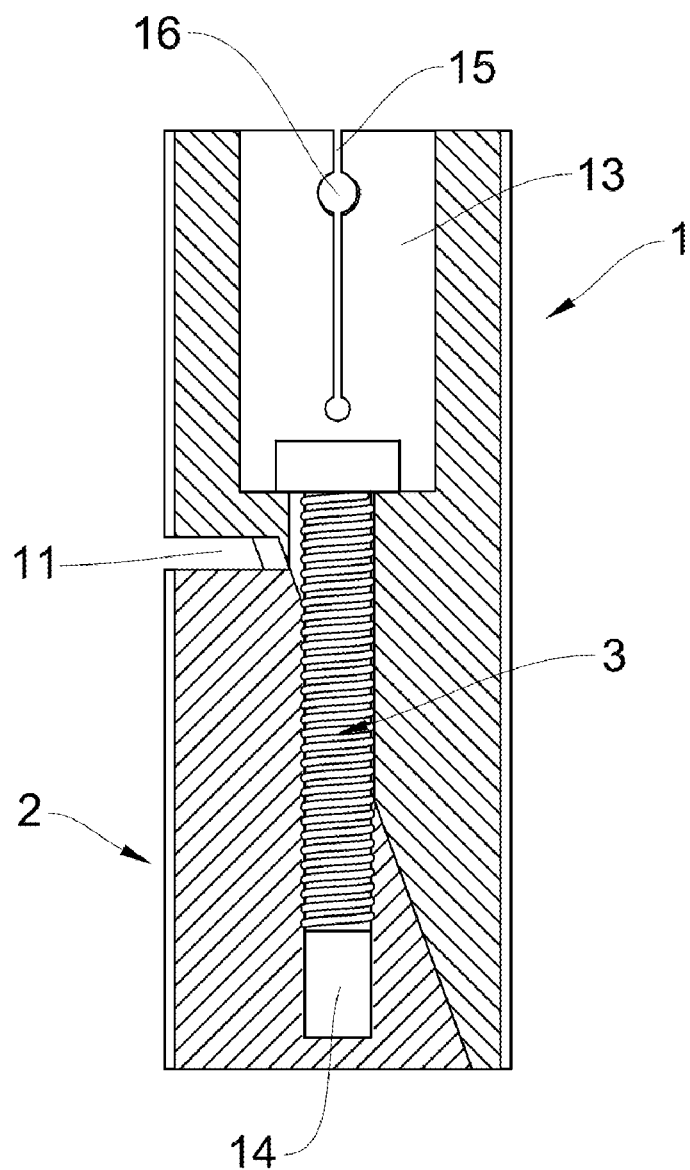
FIG. 3 is a sectional structural view of the present invention.
Figure 4:
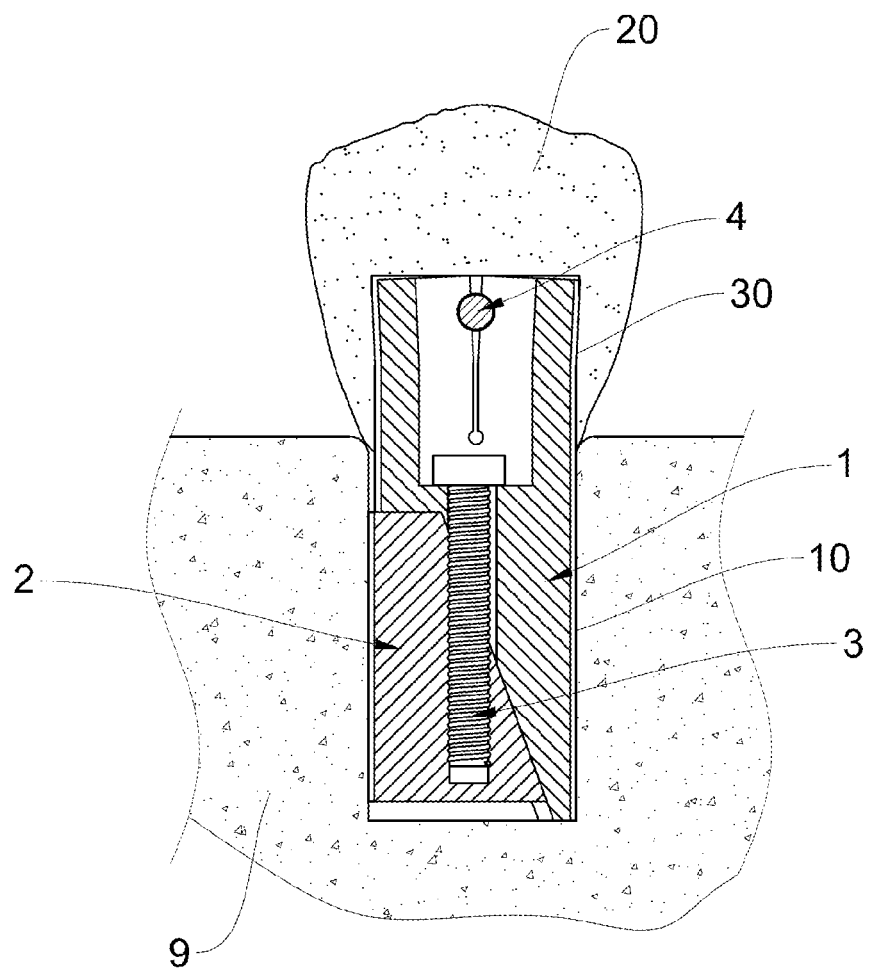
FIG. 4 is a schematic structural view showing the present invention in a use condition.

As shown in FIGS. 1-3, the present invention is an integral false tooth implanting device having expansion/widening effect at both upper and lower portions, comprising an integral expandable implant body 1, a lower protruding block 2, a vertical screw 3, and a lateral screw 4; wherein a lower portion of the expandable implant body 1 is provided with a recess 11 that accommodates the lower protruding block 2; the recess 11 has a first slanted engaging surface 12; an upper portion of the expandable implant body 1 is provided with a vertical hole 13 extending from a top side of the expandable implant body 1 down to a middle portion of the expandable implant body 1; the expandable implant body 1 is also provided with a first portion of a vertical screw hole 14 in communication with and extending down from a bottom side of the vertical hole 13 till the recess 11. Correspondingly, as shown in FIG. 2, an inner side of the lower protruding block 2 facing to the recess is correspondingly provided with a second slanted engaging surface 21; a second portion of the vertical screw hole 14 continues from a bottom end of the first portion of the vertical screw hole and opens down to the lower protruding block 2 from the second slanted engaging surface 21. As shown in FIG. 1 or FIG. 3, when assembling the present invention, the second slanted engaging surface 21 and the first slanted engaging surface 12 are in contact with each other, and the vertical screw 3 passes through the first portion of the vertical screw hole 14 of the expandable implant body 1 down to the second portion of the vertical screw hole 14 of the lower protruding block 2, and as the vertical screw 3 rotates in order to tighten the vertical screw, the lower protruding block 2 moves upwardly wherein the second slanted engaging surface 21 of the lower protruding block 2 slides upwardly along the first slanted engaging surface 12, therefore an outer side surface of the lower protruding block 2 protrudes out of an outer periphery of the expandable implant body, as shown in FIG. 4. When the lower protruding block 2 is not yet driven to move upwardly, as shown in FIG. 3, the outer side surface of the lower protruding block 2 aligns with the outer periphery of the expandable implant body 1. When the lower protruding block 2 moves upwardly wherein the second slanted engaging surface slides along the first slanted engaging surface, the outer side surface the lower protruding block 2 protrudes out of the outer periphery of the expandable implant body 1, as such, the false tooth implanting device is widened and is therefore fixed inside an implant hole 10 when the false tooth implanting device is placed within the implant hole 10 on a jaw bone 9, thereby fixedly mounting the expandable implant body 1 in the jaw bone.

As also shown in FIGS. 1-3, an expansion crevice 15 is provided across the entire upper portion of the expandable implant body 1; a lateral screw hole 16 is provided laterally across the entire expansion crevice 15 from a lateral side of the expansion crevice 15, and a diameter of the lateral screw hole 16 is smaller than a cross sectional diameter of the lateral screw 4, so that when the lateral screw 4 is screwed into the lateral screw hole 16, the expansion crevice 15 will be widened apart, and so the upper portion of the expandable implant body 1 is widened by expanding away from the expansion crevice. As shown in FIG. 4, to mount a false tooth 20 on the false tooth implant body, a bottom surface of the false tooth 20 is provided with a sleeve hole 30, and a lateral hole is provided passing through from one side to another opposite side of the false tooth so that the lateral screw 4 can pass through the lateral hole; the sleeve hole 30 of the false tooth 20 sleeves the upper portion of the expandable implant body 1; the lateral screw 4 passes through the false tooth 20 from said one side of the false tooth, through the lateral screw hole 16 and out from said another side of the false tooth; as a result, the expansion crevice 15 will be widened apart such that the upper portion of the expandable implant body 1 will expand away from the expansion crevice to press against an upper portion of an inner side wall of the sleeve hole 30, thereby holding the false tooth 20 firmly on the upper portion of the expandable implant body 1. After that, use repairing materials for false teeth to cover up the lateral hole visible on the two sides of the false teeth 20, and thus the false tooth 20 is successfully mounted. The present invention is specifically suitable for implanting a false front tooth. It is because the crown of a front tooth is sharper and thinner, so the area and space are not sufficient if it is required to fix a false front tooth by drilling a hole from the crown. By using the present invention, the false tooth can be drilled with the lateral hole and fixed from the sides thereof. Accordingly, the present invention can effectively solve the difficulty of fixing a false front tooth firmly as in the prior art.

In order that the lower protruding block 2 will not be biased to one side or displaced during its upward movement, FIG. 2 illustrate a guiding structure provided between the second slanted engaging surface 21 and the first slanted engaging surface 12. Said guiding structure comprises a slanted guiding groove 5 and a slanted guiding block 6; the slanted guiding block 6 is fitted into the slanted guiding groove 5; one of the slanted guiding block 6 and the slanted guiding groove 5 is provided on the second slanted engaging surface 21, and another one of the slanted guiding block 6 and the slanted guiding groove 5 is provided on the first slanted engaging surface 12. As shown in FIG. 2, an exemplary embodiment according to an embodiment of the present invention illustrates the slanted guiding block 6 provided on the lower protruding block 2 and the slanted guiding groove 5 provided on the expandable implant body 1.

Further, to increase frictional force during implanting procedure of the present invention in order to obtain better fixing effect without any slipping, anti-slippery textured patterns 7 as shown in FIGS. 1-3 are provided around outer peripheral surfaces of the expandable implant body 1 and the lower protruding block 2; the anti-slippery textured patterns 7 ensure better fixing effect between the false tooth implanting device and the implant hole free from slipping or loose fixation.

After implantation of the false tooth is completed, in order to prevent bone calcification at the jaw bone where the false tooth implanting device is positioned, a plurality of blood flow pores 8 are provided on the expandable implant body 1 and the lower protruding block 2. The blood flow pores 8 can effectively prevent blockage of blood flow and thus preventing bone calcification due to long term inaccessibility of blood to the bone.

What is claimed is:

1. An integral false tooth implanting device, comprising an integral expandable implant body, a lower protruding block, a vertical screw, and a lateral screw;

wherein a lower portion of the expandable implant body is provided with a cutaway portion that accommodates the lower protruding block; the cutaway portion has a first slanted engaging surface;

an upper portion of the expandable implant body is provided with a vertical hole extending from a top side of the expandable implant body down to a middle portion of the expandable implant body; the expandable implant body is also provided with a first portion of a vertical screw hole in communication with and extending down from a bottom side of the vertical hole till the cutaway portion;

correspondingly, an inner side of the lower protruding block facing to the cutaway portion is correspondingly provided with a second slanted engaging surface; a second portion of the vertical screw hole extends from the second slanted engaging surface down into the lower protruding block; the second portion of the vertical screw hole is in communication with the bottom end of the first portion of the vertical screw hole; the second slanted engaging surface and the first slanted engaging surface are in contact with each other, and the vertical screw passes through the first portion of the vertical screw hole of the expandable implant body down to the second portion of the vertical screw hole of the lower protruding block, and as the vertical screw rotates so as to be tightened, the lower protruding block moves upwardly wherein the second slanted engaging surface of the lower protruding block slides upwardly along the first slanted engaging surface, therefore an outer side surface of the lower protruding block protrudes out of an outer periphery of the expandable implant body;

an expansion crevice is provided as two separate portions at the upper portion of the expandable implant body along a same diameter of the upper portion of the expandable implant body with each portion of the expansion crevice having a depth extending from the top side of the expandable implant body down into the upper portion of the expandable implant body and a length that cuts through a wall thickness of the upper portion of the expandable implant body; a lateral screw hole is provided as two separate portions inset from the top side of the expandable implant body; each separate portion of the lateral screw hole extends laterally through a corresponding separate portion of the two separate portions of the expansion crevice through the wall thickness of the upper portion of the expandable implant body, and a diameter of the lateral screw hole is smaller than a cross sectional diameter of the lateral screw, so that when the lateral screw is screwed into the lateral screw hole, the expansion crevice is widened apart, and so the upper portion of the expandable implant body is widened by expanding away from the expansion crevice.

2. The integral false tooth implanting device of claim 1, wherein a guiding structure is provided between the second slanted engaging surface and the first slanted engaging surface; said guiding structure comprises a slanted guiding groove and a slanted guiding block.

3. The integral false tooth implanting device of claim 1, wherein anti-slippery textured patterns are provided around outer peripheral surfaces of the expandable implant body and the lower protruding block.

4. The integral false tooth implanting device of claim 1, wherein a plurality of blood flow pores are provided on the expandable implant body and the lower protruding block.

* * * * *